(12) United States Patent
Almenar Belenguer

(10) Patent No.: US 9,298,845 B2
(45) Date of Patent: Mar. 29, 2016

(54) METHOD AND SYSTEM OF DETECTION OF VIEWING OF OBJECTS INSERTED IN WEB PAGES

(75) Inventor: Pedro Almenar Belenguer, Madrid (ES)

(73) Assignee: VODAFONE GROUP PLC, Newbury, Berkshire (GB)

( * ) Notice: Subject to any disclaimer, the term of this patent is extended or adjusted under 35 U.S.C. 154(b) by 1121 days.

(21) Appl. No.: 12/595,582

(22) PCT Filed: Apr. 10, 2008

(86) PCT No.: PCT/ES2008/000222
§ 371 (c)(1),
(2), (4) Date: May 11, 2010

(87) PCT Pub. No.: WO2008/122686
PCT Pub. Date: Oct. 16, 2008

(65) Prior Publication Data
US 2010/0217666 A1    Aug. 26, 2010

(30) Foreign Application Priority Data
Apr. 10, 2007   (ES) .................................. 200700938

(51) Int. Cl.
*G06Q 30/00*        (2012.01)
*G06F 17/30*        (2006.01)
*G06Q 30/02*        (2012.01)

(52) U.S. Cl.
CPC .......... *G06F 17/30905* (2013.01); *G06Q 30/02* (2013.01); *G06Q 30/0246* (2013.01)

(58) Field of Classification Search
CPC ...................... G06Q 30/0241; H04L 29/08072
USPC ............................................ 705/14; 709/224
See application file for complete search history.

(56) References Cited

U.S. PATENT DOCUMENTS

| | | | |
|---|---|---|---|
| 6,268,852 B1 | 7/2001 | Lindhorst et al. | |
| 6,279,036 B1 * | 8/2001 | Himmel et al. | ............... 709/224 |
| 6,317,782 B1 | 11/2001 | Himmel et al. | |
| 6,553,417 B1 | 4/2003 | Gampper | |
| 2002/0032035 A1 | 3/2002 | Teshima et al. | |

(Continued)

OTHER PUBLICATIONS

Spanish Search Report dated Apr. 10, 2007 in Application No. ES 2 304 882.

(Continued)

*Primary Examiner* — Matthew L Hamilton
(74) *Attorney, Agent, or Firm* — B. Aaron Schulman, Esq.; Stites & Harbison, PLLC.

(57) ABSTRACT

The invention relates to a method and system for detecting the display of objects inserted in web pages. The method comprises downloading (12) a web page from a web server (2) to a web browser of a customer, said web page including information regarding a detection function for detecting the display on the screen of the web browser of the objects inserted in the web page; downloading (14) the objects to be inserted in the web page from an inserted object provider server (3) to the customer's web browser; inserting said objects in the web page; associating the detection function with the inserted objects; the web browser sending (15) a message with the identifier of the displayed object to a hit measurement server (4) each time the detection function detects that an object has been correctly displayed; monitoring the displays of said objects in the hit measurement server (4).

10 Claims, 1 Drawing Sheet

(56) References Cited

U.S. PATENT DOCUMENTS

| | | |
|---|---|---|
| 2002/0103822 A1 | 8/2002 | Miller et al. |
| 2003/0050833 A1* | 3/2003 | Hamzy et al. .................. 705/14 |
| 2005/0262104 A1* | 11/2005 | Robertson et al. ............. 707/10 |
| 2007/0118640 A1* | 5/2007 | Subramanian et al. ....... 709/224 |
| 2008/0114875 A1* | 5/2008 | Anastas et al. ................ 709/224 |
| 2008/0306794 A1* | 12/2008 | Cohen et al. ...................... 705/7 |
| 2010/0325533 A1* | 12/2010 | Artz .............................. 715/235 |
| 2011/0055023 A1* | 3/2011 | McNeeley et al. ......... 705/14.72 |
| 2011/0082755 A1* | 4/2011 | Itzhak ........................ 705/14.69 |
| 2011/0137733 A1* | 6/2011 | Baird et al. ................ 705/14.68 |
| 2012/0047203 A1* | 2/2012 | Brown et al. .................. 709/203 |
| 2012/0204094 A1* | 8/2012 | Liang ............................ 715/234 |
| 2013/0185164 A1* | 7/2013 | Pottjegort .................. 705/14.73 |
| 2013/0212460 A1* | 8/2013 | Balasubramanian ......... 715/234 |
| 2013/0305170 A1* | 11/2013 | de Souza et al. .............. 715/760 |
| 2014/0229268 A1* | 8/2014 | Clapp et al. ................ 705/14.41 |
| 2014/0281901 A1* | 9/2014 | Mostowy et al. ............. 715/234 |
| 2015/0235261 A1 | 8/2015 | Shulman et al. |

OTHER PUBLICATIONS

European Office Action dated Apr. 28, 2011 in EP 08 761 469.9.

* cited by examiner

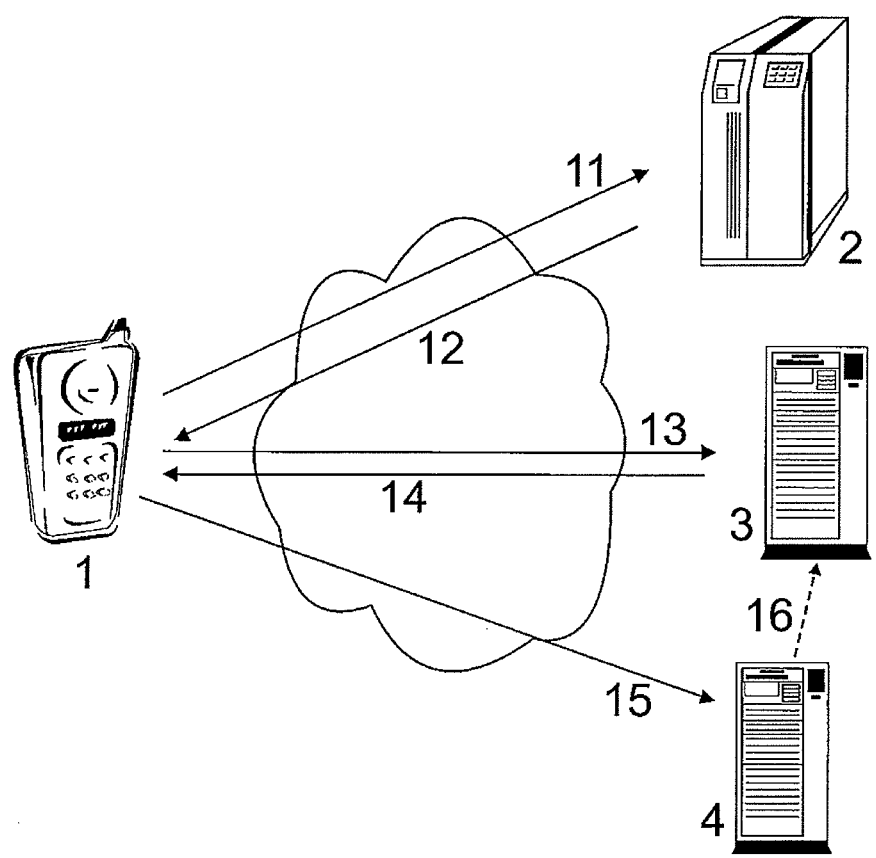

METHOD AND SYSTEM OF DETECTION OF VIEWING OF OBJECTS INSERTED IN WEB PAGES

FIELD OF THE INVENTION

The present invention is comprised within of the field of Internet advertising, and more specifically it is applied in order to ensure advertising servers that a banner of a web page has not only been downloaded in a web browser but also viewed by the end customer. It is especially applied to mobile terminals, although it can also be applied to computer web browsers.

BACKGROUND OF THE INVENTION

A good part of the web sites currently existing on the Internet are solely financed by the income obtained by inserting advertising banners (normally Flash animations or images) of other advertisers on their web pages, next to the fundamental contents of said sites.

The mentioned advertising income is obtained in two ways:

On one hand, by the total audience of said banners. This variable is measured by counting the number of times the advertising banners are downloaded in the customers' browsers. Said amount is easy to determine given that it equals the number of direct requests of such banners from the customers' browsers, which banners are normally stored in specific advertising servers normally different from those of the web pages in which they are inserted.

On the other hand, by the explicit interest of the customers in such banners. This parameter is measured by counting the number of times the customers request more information about the advertisement in question by clicking with the cursor on the banner associated to said advertisement. This number is usually much lower than the previous one because it usually depends on the motivation of the customer to click, on the appeal of the advertising banner, etc.

The comparison between the number of banner downloads and the number of times the customers see said banners in the PC world is due to the fact that the banners are usually placed in the pages such that the customer can see them upon downloading the page without needing to scroll. Downloading therefore implies displaying the banner in PC environments.

Despite the foregoing, in the past few months mobile devices (mobile terminals, PDAs, etc.) are beginning to come out which allow browsing the Internet without the user needing to have a PC. Given that the size of the screen of such mobile devices is much smaller than that of a normal PC, several technologies for displaying the contents on small screens have come out in order to facilitate displaying web pages:

On one hand, the most basic and evident technology is not to do anything with the content such that if a page takes up the size of a conventional PC screen, if a terminal browses through the same page it must scroll both horizontally and vertically to see the entire page. This option is the least used due to its poor usability for accessing texts.

An improvement to the foregoing is the technology which the new Nokia® S60 R3 terminals implement, incorporating a new browser based on the Apple® Safari browser which, although forcing the subscriber to scroll horizontally to see the entire page, allows such subscriber to read the texts of the page without needing to scroll, i.e. adapting the paragraphs of the text to the width of the screen of the terminal.

A variation of the previous solutions consists of completely reformatting the web page completely displaying it as a column in the terminal, always preventing the need to scroll horizontally. Solutions such as Opera Mini or Blackberry® implement this variation, which generally (although not mandatorily) requires the existence of a specific server for reformatting the pages.

In all the previous cases and due to the size of the screen it is impossible to ensure that an advertising banner downloaded in the browser is finally viewed by the customer, nevertheless the mentioned advertisement measuring systems usually count the banners downloaded in mobiles as advertising hits in customers.

It is therefore necessary to find a way to ensure advertising servers that a banner of a web page has not only been downloaded in a browser of a mobile terminal but also viewed by the end customer.

Although languages such as JavaScript allow certain control of the position of the objects (essentially their ends) on the screen, managing said position when the subscriber scrolls becomes more complicated (impossible in some cases). Likewise, the page reformatting which some solutions such as those previously described carry out, usually makes treating such position in JavaScript impossible, for which reason it is necessary that the browser itself is what determines whether or not the object has been displayed.

It is known that abbreviations and acronyms are frequently used in the field of computer mobile telephony and web browsers. A glossary of terms and acronyms used through the present specification is provided below:
   HTML: HyperText Markup Language
   HTTP: Hypertext Transfer Protocol
   IP: Internet Protocol
   URL: Universal Resource Locator
   W3C: World Wide Web Consortium

DESCRIPTION OF THE INVENTION

The invention relates to a method for detecting visible objects in web browsers and to a system as further described herein. It also relates to a detection method as further described herein. Preferred embodiments of the method and of the system are also further described herein.

The method object of the invention comprises the following steps:
   downloading a web page from a web server to a web browser of a customer, said web page including information regarding a detection function for detecting the display on the screen of the browser of at least one of the objects inserted in the web page;
   downloading the objects to be inserted in the web page from an inserted object provider server to the customer's web browser;
   inserting said objects in the web page;
   associating the detection function for detecting the display of objects with at least one of the inserted objects;
   the web browser sending a message to a hit measurement server each time the detection function detects that the at least one inserted object to which it has been associated has been correctly displayed, said message containing:
      the identifier of the at least one correctly displayed object; and optionally:
      the web page in which the object is inserted;
      the terminal model and/or web browser used;
      information relating to the customer using the browser;
      monitoring the occurred correct displays of the inserted objects in the hit measurement server (4).

A system for detecting the display of objects inserted in web pages is also an object of the present invention. The system comprises:

an electronic device of a customer, said device having a web browser;

a web server configured to send a web page at the request of the web browser of the electronic device, said web page including information regarding a detection function for detecting the display on the screen of the browser of at least one of the objects inserted in the web page;

an inserted object provider server configured to send to the customer's web browser the objects to be inserted in said web page, the detection function for detecting the display of objects being associated in the web browser with at least one of the inserted objects;

a hit measurement server in charge of monitoring the correct viewings by the customer of the objects inserted in said web page.

The web page is configured to make the web browser send a message to the hit measurement server (4) each time the detection function detects that at least one inserted object has been correctly displayed on the screen of the browser, said message containing:

the identifier of the at least one correctly displayed object; and optionally:
the web page in which the object is inserted;
the terminal model and/or web browser used;
information relating to the customer using the web browser.

The detection function can comprise the definition of events associated to the objects inserted in the web page.

The events associated to the objects inserted in the web page can comprise at least:

a first event which is activated when an inserted object is displayed in the web browser window at a proportion equal to or greater than a specified proportion $P_{SPE}$ in said event, in which case it is deemed that the object has been displayed;

a second event which is activated when an inserted object, being displayed in the web browser window at a proportion equal to or greater than the specified proportion $P_{SPE}$, is displayed in said browser window at a proportion lower than the specified proportion $P_{SPE}$.

The events associated to the objects inserted in the web page can alternatively comprise at least:

a first event which is activated when an inserted object is completely displayed in the web browser window;

a second event which is activated when an inserted object, being completely displayed in the web browser window, stops being displayed;

a third event which is activated when an inserted object which was not displayed in the browser window becomes partially visible;

a fourth event which is activated when an inserted object being partially visible is not displayed in the browser window.

The detection function can consider that an inserted object has been correctly displayed at the time that it is deemed that the object has been displayed. However it can also consider than an inserted object has been correctly displayed when it is deemed that the object has been displayed for a certain specified time $T_{SPE}$, for the case of animations for example. To that end the detection function would additionally comprise time measurement instructions for measuring the time from which an inserted object is deemed displayed until it is deemed that it has stopped being displayed, said detection function considering that the inserted object has been correctly displayed if said time measurement exceeds the specified time $T_{SPE}$.

The information regarding the detection function for detecting the display of the objects inserted in the web page can include at least some of the following data:

the code defining the detection function;
a link to said code.

The inserted objects the display of which is detected by the detection function are preferably advertising banners.

The method can additionally comprise the hit measurement server supplying to the inserted object provider server information relating to the display of the inserted objects. The hit measurement server will be configured to carry out said action. The information relating to the display of the inserted objects can include for example information relating to the customer, terminal model or browser used, etc.

Also an object of the present invention is a method for detecting the display of objects inserted in web pages based on the use of events, comprising the following steps:

downloading a web page from a web server to a web browser of a customer, said web page including information regarding a detection function for detecting the display on the screen of the browser of at least one of the objects inserted in the web page, said detection function comprising the definition of events associated to the objects inserted in the web page;

downloading the objects to be inserted in the web page from an inserted object provider server to the customer's web browser;

inserting said objects in the web page;

associating the detection function for detecting the display of objects with at least one of the inserted objects; the detection function comprising the definition of events associated to the objects inserted in the web page, comprising at least:

a first event which is activated when an inserted object is displayed in the web browser window at a proportion equal to or greater than a specified proportion $P_{SPE}$ in said event, in which case it is deemed that the object has been displayed;

a second event which is activated when an inserted object,
being displayed in the web browser window at a proportion equal to or greater than the specified proportion $P_{SPE}$, is displayed in said browser window at a proportion lower than the specified proportion $P_{SPE}$.

Also an object of the present invention is a method for detecting the display of objects inserted in web pages based on the use of events, comprising the same steps as in the method of the previous paragraph and in which the detection function likewise comprises the definition of events associated to the objects inserted in the web page, comprising at least the following events:

a first event which is activated when an inserted object is completely displayed in the web browser window;

a second event which is activated when an inserted object, being completely displayed in the web browser window, stops being displayed;

a third event which is activated when an inserted object which was not displayed in the browser window becomes partially visible;

a fourth event which is activated when an inserted object being partially visible is not displayed in the browser window.

BRIEF DESCRIPTION OF THE DRAWINGS

A drawing will be very briefly described below which aids in better understanding the invention and which is specifically related to an embodiment of said invention set forth as an illustrative and non-limiting example thereof.

FIG. 1 shows a general scheme of the elements involved in the present invention as well as the flow of the information.

DESCRIPTION OF A PREFERRED EMBODIMENT OF THE INVENTION

The display of an object on a screen of a browser essentially depends on two parameters:

The percentage or proportion of the object (percentage of the area, of the total length, etc.) being displayed in the browser window (or the screen of the terminal if the window and screen coincide).

Optionally, on the minimum time in which said object is displayed in the browser window (this is critical for graphic animations for example).

On that basis, the solution provided herein includes the following elements:

1. A browser in the customer's device 1 which can detect two situations associated to an object (i.e. a text, an image, Flash animation, etc.) within a web page (essentially an html page):

a. Visible Object. The situation is detected when a percentage or proportion of the object displayed is equal to or greater than a certain specified percentage in the browser window, which percentage or proportion can be that of the displayed height of the object with respect to its total height and/or that of the displayed width of the object with respect to its total width and/or that of the displayed area of the object with respect to its total area, etc.

b. Non-Visible Object. The situation is detected when a percentage or proportion of the object displayed being equal to or greater than that specified (the same percentage or proportion types apply as in the Visible Object case) is shown in the browser window of the device 1 at a percentage or proportion lower than that specified.

The Internet world offers many languages (ECMAScript, JavaScript, . . . ) which allow associating events (such as the events defined by W3C 'placement of the cursor of the mouse on an object' or mouseover, 'pressing a key' or keydown, etc. for example) to objects of web pages (pages written in languages such as WML, XHTML, HTML, SVG, Flash, etc.), therefore a possible (preferred but non-limiting) implementation for detecting such situations would be through the definition of the corresponding VisibleObject and Non-VisibleObject events, which do not currently exist in any language.

The definition of such events is carried out by specifying:

The object to which they are associated within the web page.

Optionally, the minimum percentage or proportion of the object which must be displayed (or stop being displayed in the case of the Non-VisibleObject event) so that the event can be triggered, specified as a minimum area percentage or proportion and/or minimum height percentage or proportion of the object and/or minimum width percentage or proportion of the object displayed in the browser window with respect to the total area, height or width of the object.

Despite the foregoing, ECMAScript (or JavaScript) does not currently allow passing from parameters to events, therefore an immediate alternative to the definition of percentages, until such percentages cannot pass as parameters, is the definition, for example, of the following events:

CompetelyVisibleObject. It is triggered when the object becomes completely visible in the browser window.

NotCompetelyVisibleObject. It is triggered at the time in which an object which has become completely visible in the browser window stops being completely visible.

PartiallyVisibleObject. It is triggered when an object which was not displayed in the browser window becomes partially visible.

Non-VisibleObject. It is triggered at the time in which a partially visible object stops being visible.

Given that all the previous events are new and therefore do not currently exist, it is necessary to update the customer's browser either natively or through a plug-in or additional software code for the use thereof.

The browser can be optionally identified in its requests to any web server as a browser supporting the previously mentioned events.

2. A web server 2, which after a request from a browser such as that provided in the previous paragraph, returns the requested page. The objects the display of which is to be measured will be inserted in the page, which objects will be served from the inserted object provider (i.e. in the requested page there will be links to addresses of the inserted object provider from which to download the objects in question, which download is automatically carried out from the browser without the intervention of the user after requesting the page). Likewise, there must be a certain code in the page which, executed in the browser, allows a browser such as that described in previous point 1 to detect the display of the inserted objects (completely, partially or with the display percentage that is to be defined) and inform the measurement server of the fact by means of a message (this message can be an http GET or POST, any other http message or even a message in another protocol supported by the browser; said message must include information about the page in which the object was inserted, the terminal model and/or browser used, the object in question viewed by the customer and optionally, information about the customer in question if available (such as for example his or her IP address, any cookie which has been previously downloaded with this object, etc.)). Said code can optionally be in another server and be downloaded in the browser by a reference from the main page returned by the web server 2. Said code can also optionally incorporate time measurement instructions for measuring the time from which an object is displayed until it stops being displayed, such that it only informs the measurement server if said time exceeds a certain threshold.

3. An inserted object provider server 3, which for each request of an object will return the most suitable corresponding object, depending not only on the origin web page but potentially on other variables such as the terminal model/browser, customer identity (his or her IP address, any cookie, etc.), etc. The inserted object provider server 3 can optionally count and record the object requests made, especially in the case of browsers not supporting the previously mentioned events.

4. A server for measuring object displays, which will be called a hit measurement server 4 (normally being an advertising hit measurement server) which, once having received from the browser the message of detecting the display of the object, records and counts the hit of the corresponding object, as well as the page in which the object is inserted, the terminal model and the possible information about the identity of the customer supplied by the browser. This would allow the server:

To charge the advertiser depending on the number of total hits and/or per number of different customers (for the latter it would be sufficient to count the messages associated to the same object and the same customer just once).

To pay the provider of the web page in which the object is inserted depending on the number of actual hits from that page.

To determine which objects are more likely to be displayed in which telephones by comparing the number of hits with the number of downloads of said objects. This can allow adapting objects specifically to terminal models for thus improving their viewing rate by the end customer.

To inform the inserted object provider server 3 of whether or not a subscriber saw the object, such that said server can decide to send the same object again or another different object to that subscriber in the case of future requests.

It must be noted that although the main value of this invention appears in browsing the Internet from mobile terminals, the invention can also be applied to browsing from a PC, given that in PCs it is sometimes necessary to scroll vertically in order to be able to access the complete content of some pages, which implies that there may be objects in the pages concealed from the customer if he or she does not perform said scroll.

The process to be followed in the customer's browser would be the following:

S1. The user whose browser is able to detect the previously described scenarios (e.g. because it is able to detect the described events) introduces therein a URL corresponding to the web page to be seen, or clicks on said URL from another web page, his or her list of favorites, his or her record of visited web pages, etc. The browser of the user sends 11 an http request to the provider 2 of the web page with the mentioned URL, optionally indicating in the message that it supports a detection mechanism for detecting the described scenarios.

S2. The provider responds 12 with the requested page. The requested page can include a certain code for defining the 'VisibleObject' event (or the mechanism for detecting such situation that the browser has defined) and the URL of the server to be notified in the case of triggering the event (i.e. the hit measurement server), or include a link to said code in which the event is defined (or detection mechanism), placed in another server. In the second case the browser will transparently download said code from that other server in which it is located, a process which is not shown in the FIGURE. It must be noted that the server in question can optionally insert any cookie or include any heading or parameter in the URL of the server to be notified, which later allows the hit measurement server (and/or the inserted object provider) to identify the customer or his or her browsing session.

S3. Upon analyzing the downloaded page, the browser detects that there are objects which must be inserted in the page to be displayed and that they are located in URLs different from initially requested URL. The browser, in a transparent manner for the customer, sends 13 an http request to each of said URLs which correspond to the web site of the inserted object provider server 3. Said requests can include customer identity information (e.g. cookies, his or her IP address, etc.).

S4. The provider returns 14 each object in question, optionally together with another type of information such as cookies, etc. The specific objects returned by the provider can depend on many factors such as the identity of the customer, browser type, etc.

The code of the page returned in P2 associating the previously mentioned event (or detection mechanism for detecting the situation) with at least one of the objects received from the inserted object provider is executed upon receiving the objects in the browser. From then on the browser of the subscriber will monitor the display of said at least one object in the browser window according to the indicated configuration.

If the code of the web page requested by the customer (or of the code downloaded from that other server described in S2) thus includes it, monitoring the display can optionally take into account the duration of the display of the object. One way of doing so is to launch a timer in the browser when it is detected that the object is being displayed in the browser window in the indicated manner (e.g. at the specified percentage), and also to launch the detection of the cease of the display of the object in the browser (for example, with the Non-VisibleObject event with the same configuration as the previously armed VisibleObject event), such that:

If it is detected that the object stops being displayed in the browser window before the timer expires, the timer is canceled and the detection of the display of the object in the browser window in the initially defined conditions is re-launched.

If the timer expires beforehand, step S5 is carried out, assuming that the object was displayed according to the defined time and percentage criteria.

S5. Upon interacting with the browser and moving through the page, the customer views the object according to the criteria defined in the configuration of the event associated to the object, therefore the code of the page sends 15 a message (normally an http request) to the specified address of the hit measurement server 4, including in the message (e.g. in the headings and/or as part of the URL of the request) at least the identifier of the displayed object and optionally the web page in which it was inserted. The hit measurement server 4 will use this information together with any other information in the same message (e.g. User Agent of the device 1 or of the browser from which the request was made, subscriber identity information—e.g. cookies-, etc.) for suitably counting the hit and making a record of the displayed objects, the pages from which they were displayed, etc.

With this information the measurement servers 4 can optionally:

Calculate the amounts to be charged to the advertisers based on the displays of the corresponding advertising objects, either for total displays, per number of different customers, etc.

Calculate the amounts to be paid to the providers 2 of the web pages in which the objects were inserted, also based on the displays of the corresponding advertising objects.

Carry out object display statistics depending on the type of browser or terminal.

S6. The measurement servers can optionally supply 16 the inserted object provider server 3 different information. Specifically they can:

Supply the inserted object provider server 3 with object display statistics information depending on the type of browser or terminal for the purpose of suggesting changes in the objects to be displayed in the inserted object provider server 3 depending on the browser or terminal, in order to make the display of the objects more efficient.

Supply the inserted object provider server 3 with the information which they have received about the identity of the customers who viewed each object (based on cookies, IP address, parameters of the URL used for notifying the notification server, etc.). That allows the inserted object provider server 3, for example:
- To prevent the same object from being displayed to the same subscriber once viewed one or several times in successive requests of the customer's browser to the inserted object provider (for example because the customer visits the same page several times).
- To create a time sequence of objects to be viewed by the subscriber, for example, a sequence of objects forming part of one and the same advertising campaign.

The invention claimed is:

1. A method for detecting a display of objects inserted in web pages, said method comprising:
   receiving, by a user terminal device, a detection function that is transmitted to the user terminal device in association with a download of a web page from a web server to a web browser executing on the user terminal device;
   receiving, by the user terminal device, one or more objects to be inserted in the web page transmitted from an inserted object provider server to the web browser executing on the user terminal device;
   monitoring, by executing the detection function within the web browser on the user terminal device, a window of the web browser within which the web page is rendered for at least one object in the web page that has been specified for monitoring in association with the detection function within the window of the web browser;
   detecting, by executing the detection function within the web browser, each display of each of the at least one specified object on a screen of the user terminal device within the web browser by determining whether at least a predefined threshold extent of the specified object is displayed on the screen of the user terminal device within the window of the web browser; and
   directing, by executing the detection function within the web browser, the user terminal device to, each time the detection function detects that any of the at least one specified object is correctly displayed on the screen of the user terminal device within the web browser, transmit a message containing an identifier of the specified object to a hit measurement server.

2. The method according to claim 1, wherein the detection function comprises a definition of events that are indicative of whether objects are displayed on the screen of the user terminal device within the web browser and are associated with the at least one specified object inserted in the web page when the detection function is executed within the web browser.

3. The method according to claim 2, wherein the predefined threshold extent is a specified proportion $P_{SPE}$, and wherein the events associated with the at least one specified object inserted in the web page comprise at least:
   a first event defined as occurring upon an inserted object becoming displayed on the screen of the user terminal device within the window of the web browser at a proportion equal to or greater than the specified proportion $P_{SPE}$, the detection function detecting that the inserted object has been displayed on the screen upon determining an occurrence of the first event; and
   a second event defined as occurring upon an inserted object being displayed on the screen of the user terminal device within the window of the web browser at a proportion equal to or greater than the specified proportion $P_{SPE}$ becoming displayed on the screen of the user terminal device within the window of the web browser at a proportion lower than the specified proportion $P_{SPE}$.

4. The method according to claim 2, wherein the events associated with the at least one specified object inserted in the web page comprise at least:
   a first event defined as occurring upon an inserted object becoming completely displayed on the screen of the user terminal device within the window of the web browser;
   a second event defined as occurring upon an inserted object, which is completely displayed on the screen of the user terminal device within the window of the web browser becoming no longer displayed on the screen of the user terminal device within the window of the web browser;
   a third event defined as occurring upon an inserted object which is not displayed on the screen of the user terminal device within the window of the web browser becoming partially visible on the screen of the user terminal device within the window of the web browser; and
   a fourth event defined as occurring upon an inserted object that is partially visible on the screen of the user terminal device within the window of the web browser becoming no longer displayed on the screen of the user terminal device within the window of the web browser.

5. The method according to claim 1, wherein the detection function detects that an inserted object has been correctly displayed on the screen of the user terminal device within the web browser upon determining that at least the predefined threshold extent of the inserted object has been displayed on the screen of the user terminal device within the window of the web browser.

6. The method according to claim 1, wherein the detection function additionally comprises time measurement instructions for measuring an amount of time from when an inserted object is deemed to be displayed on the screen of the user terminal device within the web browser to when the inserted object is deemed to have become no longer displayed on the screen of the user terminal device within the web browser, and wherein the detection function detects that the inserted object has been correctly displayed on the screen of the user terminal device within the web browser upon said amount of time being measured to exceed a specified time $T_{SPE}$.

7. The method according to claim 1, wherein the web page downloaded from the web server to the web browser includes information regarding the detection function that includes at least one of:
   code executable within the web browser to implement the detection function; and
   a reference to a location from which code executable within the web browser to implement the detection function can be retrieved.

8. The method according to claim 1, wherein each of the at least one specified object is an advertising banner.

9. The method according to claim 1, wherein the hit measurement server is configured to monitor occurrences of the detection function detecting any of the at least one specified object being correctly displayed on the screen of the user terminal device within the web browser and supply to the inserted object provider server information relating to displays of the at least specified object on the screen of the user terminal device within the web browser.

10. The method according to claim 1, wherein each message transmitted by the user terminal device to the hit measurement server upon the detection function detecting any of the at least one specified object being correctly displayed on the screen of the user terminal device within the web browser further includes at least one of an indication of the web page in which the specified object is inserted; an indication a terminal model for the user terminal device, an indication of a type of the web browser executing the user terminal device, and information relating to a user operating the web browser on the user terminal device.

\* \* \* \* \*